United States Patent [19]

Page et al.

[11] Patent Number: 4,953,678

[45] Date of Patent: Sep. 4, 1990

[54] CLUTCH ACTUATION SYSTEM

[75] Inventors: Ronald C. Page, Coventry; Alan W. Hunt, Kenilworth, both of England

[73] Assignee: Massey-Ferguson Services N.V., Curacao, Netherlands Antilles

[21] Appl. No.: 349,462

[22] Filed: May 9, 1989

[30] Foreign Application Priority Data

May 11, 1988 [GB] United Kingdom ................. 8811086

[51] Int. Cl.$^5$ ............................................. F16D 11/04
[52] U.S. Cl. ............................... 192/67 R; 192/85 A; 192/13 C; 192/70.24; 192/93 B
[58] Field of Search ................. 192/67 R, 85 A, 93 A, 192/93 C, 91 A, 96, 70.23, 70.24, 93 B

[56] References Cited

U.S. PATENT DOCUMENTS

| | | | |
|---|---|---|---|
| 974,101 | 10/1910 | McGee | 192/70.23 |
| 1,306,302 | 6/1919 | Cooper | 192/70.23 |
| 1,398,554 | 11/1921 | Hawley | 192/70.23 |
| 4,159,050 | 6/1979 | Hopkins, Sr. et al. | 192/93 A |

*Primary Examiner*—Richard Lorence
*Assistant Examiner*—Andrea Pitts

[57] ABSTRACT

A clutch actuating system which is particularly suitable for connecting drive to the front wheels of a four-wheel-drive tractor. The system includes an actuating member movable between a first position in which the clutch is disengaged and a second position in which the clutch is engaged. A pair of adjacent reaction members (27,29) encircle the actuating member and have mutually inclined wedging surfaces (30,31) on confronting faces. One (27) of the reaction members is connected with the clutch (25,26) which is of the toothed-dog type. A number of elongated toggle members (33) are connected at one end with the actuating member (32) and extend between the wedging surfaces of the reaction members at their other ends. Movement of the actuating member from its first to its second position causes the toggle members to execute a toggle action and to be forced further between the wedging surfaces (30,31) to separate the reaction members (27,29) to engage the clutch and cause the toggle members to assume a stable position in which the actuating member is held in its second position by the toggle members thus holding the clutch engaged. The teeth (25,26) of the clutch may be angled on co-operating surfaces to provide a separation force which tends to disengage the teeth to facilitate disengagement of the clutch.

12 Claims, 5 Drawing Sheets

CLUTCH ACTUATION SYSTEM

This invention relates to clutches and in particular to actuating systems for operating clutches.

There is a longstanding requirement for a simple but efficient clutch actuating system which is capable of holding a clutch in an engaged condition without the need to apply continuous engagement pressure.

It is an object of the present invention to provide a clutch actuating system which meets the above longstanding requirement.

Thus according to the present invention there is provided a clutch actuating system comprising:

an actuating member movable between a first position in which the clutch is disengaged and a second position in which the clutch is engaged, a pair of adjacent reaction members with mutually inclined wedging surfaces on confronting faces, one of said reaction members being operatively connected with the clutch, and at least one elongated toggle member operatively connected at one end with the actuating member and extending between the wedging surfaces of the reaction members at its other end, the arrangement being such that movement of the actuating member from its first to its second position causes the toggle member to execute a toggle action and to be forced further between the wedging surfaces to separate the reaction members to engage the clutch and causes the toggle member to assume a stable position in which the actuating member is held in its second position by transmission of force along the the toggle member between its ends thus holding the clutch engaged.

The toggle member may be arranged to move over-centre to its stable position thus ensuring a higher clutch engaging force.

The actuating member may be encircled by the reaction members and arranged so that axial movement of the actuating member relative to the reaction members forces the toggle members radially outwardly between the wedging surfaces on the reaction members thus axially displacing one of the reaction members to engage the clutch.

A clutch actuating system of the form described above is particularly suitable for clutching a gear wheel to a shaft using a toothed dog-type clutch since for a given axial movement of the actuating member the toggle action generates a large radial movement of the toggle members and hence a large axial movement of one of the reaction members which is often required for toothed dog-type clutches.

One application of the above type for which an actuating system of the present invention is particularly suitable is the clutching of a driving gear to a front wheel drive shaft on a four-wheel-drive tractor.

The present invention also provides a toothed-dog type clutch in which two toothed dog members are axially displaced relative to each other by a toggle arrangement of the form described above.

In a prefered arrangement (which is again particularly suitable for the tractor front wheel drive application referred to above) the interengaging teeth of the dog members are angled on co-operating surfaces to provide a separation force tending to disengage the dog members. This ensures that as soon as the actuating member is moved towards its first position sufficiently to move the toggle members away from their stable position the dog members are disengaged by the separation force. Such a feature is particularly important in the front wheel drive application refered to above where it is often necessary to disengage drive to the front wheel drive output shaft whilst the teeth of the dog clutch are still under load.

One embodiment of the present invention will now be described, by way of example only, with reference to the accompanying drawings in which.

Figure 1:
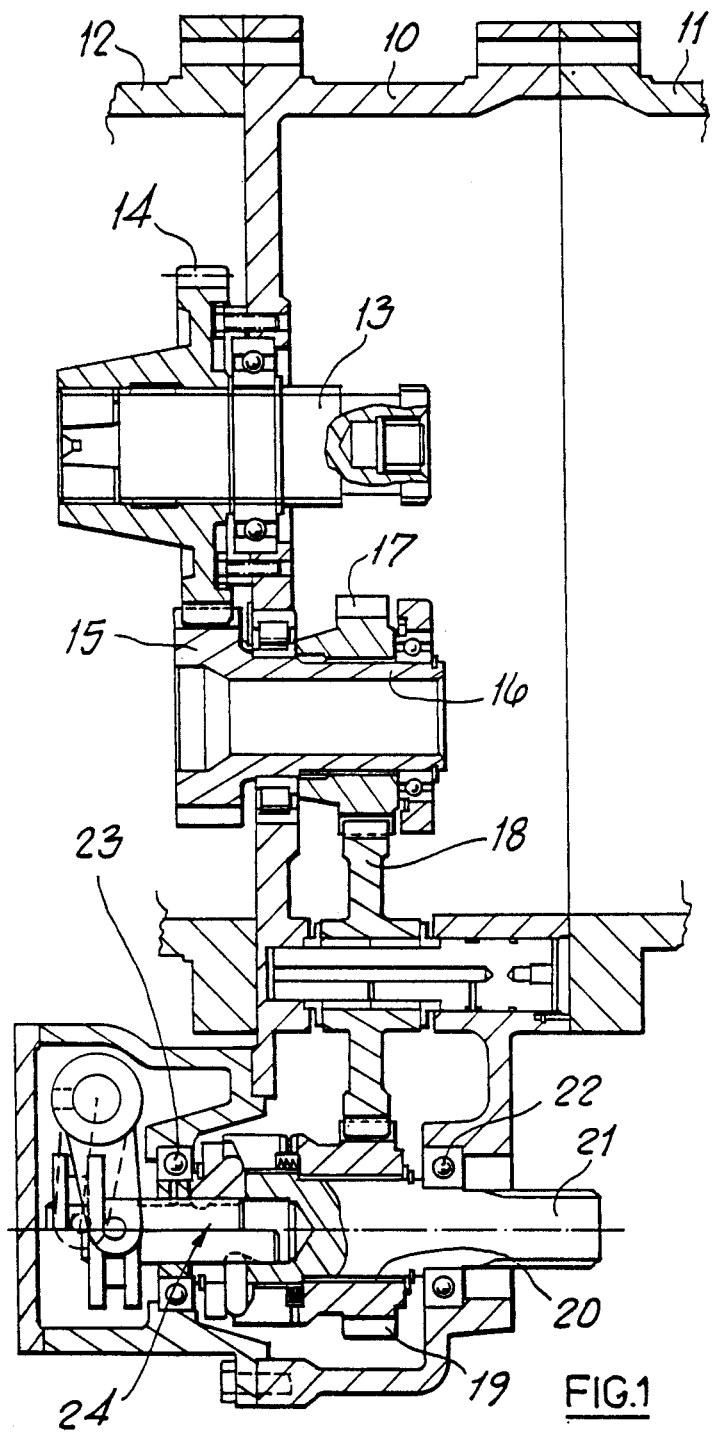
FIG. 1 is a vertical section through a front wheel drive train of a four-wheel-drive tractor and includes a clutch and a clutch actuating system in accordance with the present invention.

Referring to FIG. 1, this shows a tractor front wheel drive train mounted in a spacer housing 10 which is bolted between a tractor transmission housing 11 and a back axle housing 12. The spacer housing 10 carries a shaft 13 which is driven from the output shaft of the transmission (not shown). Shaft 13 carries gear 14 which meshes with an idler gear 15. Idler gear 15 has an integral stub shaft 16 which carries a further gear 17. Gear 17 meashes with a further idler gear 18 which in turn meshes with an output gear 19 which is mounted by a plain bearing 20 on a front wheel drive output shaft 21 which is supported by bearings 22 and 23 from the housing 10.

The output gear 19 is clutched to the output shaft 21 using a clutch arrangement 24 in accordance with the present invention. As can best be seen from FIG. 2, the output gear 19 includes a set of dog-teeth 25 which are engagable with a further set of dog-teeth 26 on a first reaction member 27. Reaction number 27 is splined to output shaft 21 at 28. A second reaction member 29 also encircles the output shaft 21. Both reaction members 27 and 29 are provided with wedging surfaces 30 and 31 respectively on their confronting faces. The wedging surface 30 is of planar (or possibly slightly concave) cross-section while the surface 31 is of curved convex cross section. An actuating shaft 32 is disposed within output shaft 21 and receives three elongated wedging or toggle members 33 in a circumferentially extending groove 34. Each toggle member 33 extends radialy outwardly through a respective slot 35 in the output shaft 21 and projects at its outer end between the wedging surfaces 30 and 31 of the reaction members.

The actuating shaft 32 is pinned at 36 into a slot 21a in the output shaft 21 to prevent relative rotation between shafts 32 and 21 but to allow shaft 32 to move axially relative to output shaft 21 under the action of pins 37 carried by arms 38 on a rotatable selector shaft 39. The pins 37 engage in a groove 40 provided in a flange end 41 of the actuating shaft 32.

Figure 3:
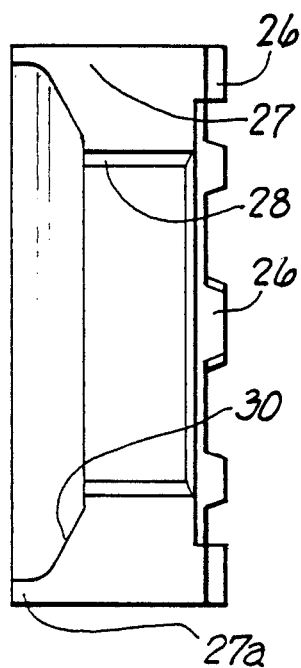
FIGS. 3 to 5 show details of the toothed clutch members used in the, clutch of FIG. 2.
Figure 4:
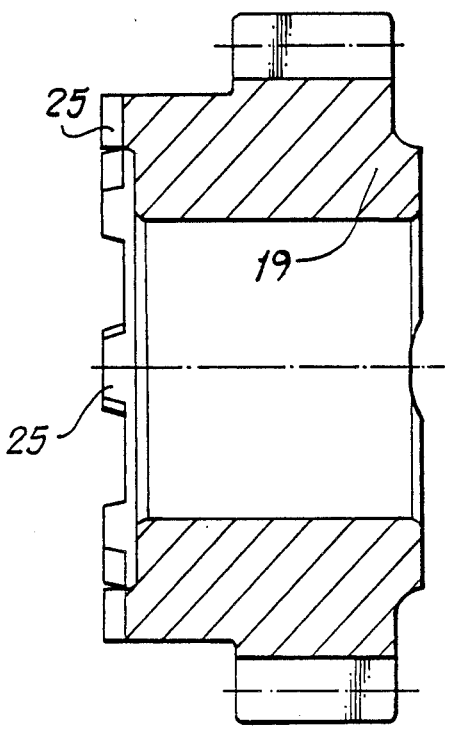
Figure 5:
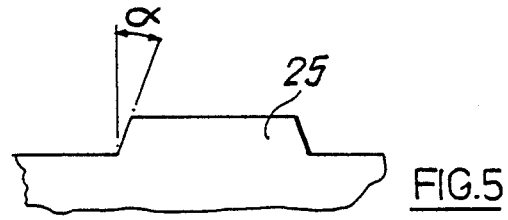

Further details of the dog-teeth 25 and 26 on output gear 19 and reaction member 27 can be seen from FIGS. 3 to 5. The dog-teeth have angled flanks inclined at an angle (typically 20 degrees) so that a separation force is automatically generated which tends to disengage the dog teeth if no axial force is applied to hold the dog-teeth in engagement. Springs 42 also provide an additional separation force.

Figure 2:
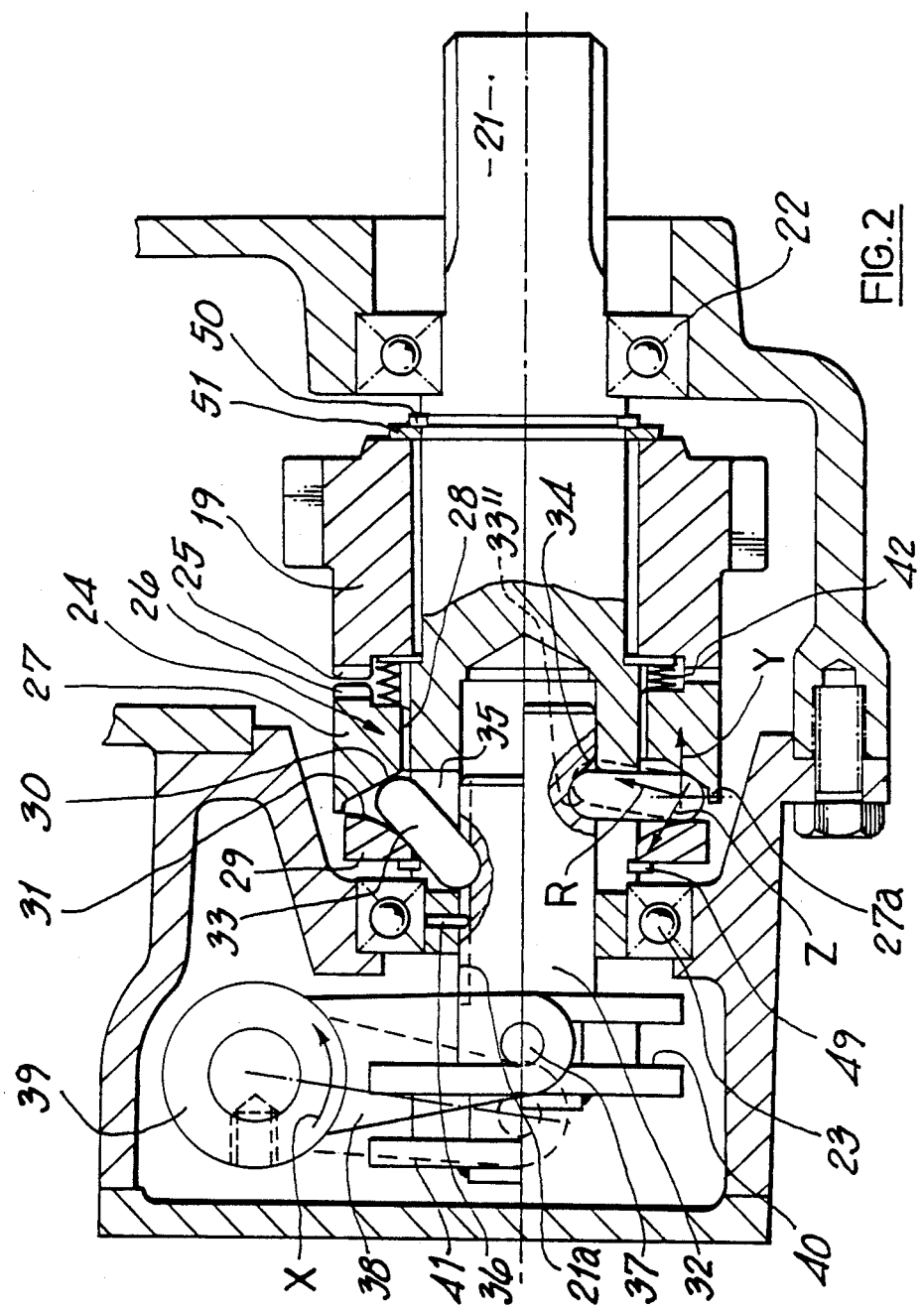
FIG. 2 shows an enlarged view of the clutch and clutch actuating system of FIG. 1.

Referring to FIG. 2, the actuating shaft 32, toggle members 33, reaction members 27 and 29, and dog-teeth 25 and 26 are all shown in their disengaged position in the upper part of FIG. 2. To engage the dog-teeth 25 and 26 and thus couple the gear 19 to output shaft 21, the selector shaft 39 is rotated counter-clockwise as shown by the arrow X of FIG. 2. This forces the toggle members radially outwardly further between the confronting wedging surfaces 30 and 31 and thus displaces the reaction member 27 to the right relative to the reaction member 29, as viewed in FIG. 2, to bring the teeth 25 and 26 into engagement. The curvature of wedging surface 30 ensures that the toggle members 33 move radially outwardly by rolling round the surface 30 without any sudden changes in direction.

In the lower half of FIG. 2 the actuating shaft 32 is shown in its clutch engaging position in which the toggle members 33 are disposed at right angles to actuating shaft 32 and therefore in a stable condition. Analysis of the reaction forces applied to the toggle members 33 by the reaction members at 27 and 29 reveals a reaction force Z (see FIG. 2) directed generally at right angles to the tangent at the point of contact with the wedging surface 30 and a reaction force Y directed at right angles to the tangent at the point of contact with the wedging surface 31. These two reaction forces combine to produce a resultant force R directed generally in the direction of the arrow R of FIG. 2. It will be observed that this force, which is applied to the actuating shaft 32 via the inner ends of the toggle members 33, is directed so as to tend to push the actuating shaft 32 to the right, as viewed in FIG. 2, thus holding the actuating shaft in the position shown in the lower half of FIG. 2 and hence holding the two sets of teeth 25 and 26 in engagement.

By suitable adjustment of the geometry of the above described actuating mechanism it is possible to arrange the resultant force R to be sufficient to overcome the separating force generated by the angled flanks of the teeth 25 and 26 and the springs 42 to hold the teeth 25 and 26 in engagement without the need to apply any force to the actuating shaft 32 once the toggle members have assumed their stable position shown in the lower half of FIG. 2.

If desired the toggle members 33 can be arranged to toggle over-centre when in the clutch engaged position to assume the inclined position 33" shown in the lower half of FIG. 2. This arrangement provides an even greater resultant force R acting to tend to push the actuating shaft to the right as viewed in the lower half of FIG. 2.

A circumferentially extending lip 27a on reaction member 27 prevents the toggle members being radially outwardly displaced beyond their normal stable position (due to high centrifugal action caused by excessive speed) to a position in which they could not be released by movement of the shaft 32 as described below.

To disengage the teeth 25 and 26 the clutch shaft 39 is rotated clockwise to move the actuating shaft to the left as viewed in the lower half of FIG. 2. Once the toggle members 33 are no longer in their stable position at right angles to actuating shaft 32 the resultant force R no longer tends to hold the actuating shaft 32 in the clutch engaged position and the separating force generating by the angle flanks of teeth 25 and 26 and the springs 42 both combined to assist the movement of the actuating shaft to the left thus significantly lowering the level of force which must be applied to the actuating shaft 32 in order to disengage the clutch teeth 25 and 26.

Circlips 49 and 50 and thrust washer 51 take the separating force and prevent its transmission to bearings 22 and 23.

Figure 6:
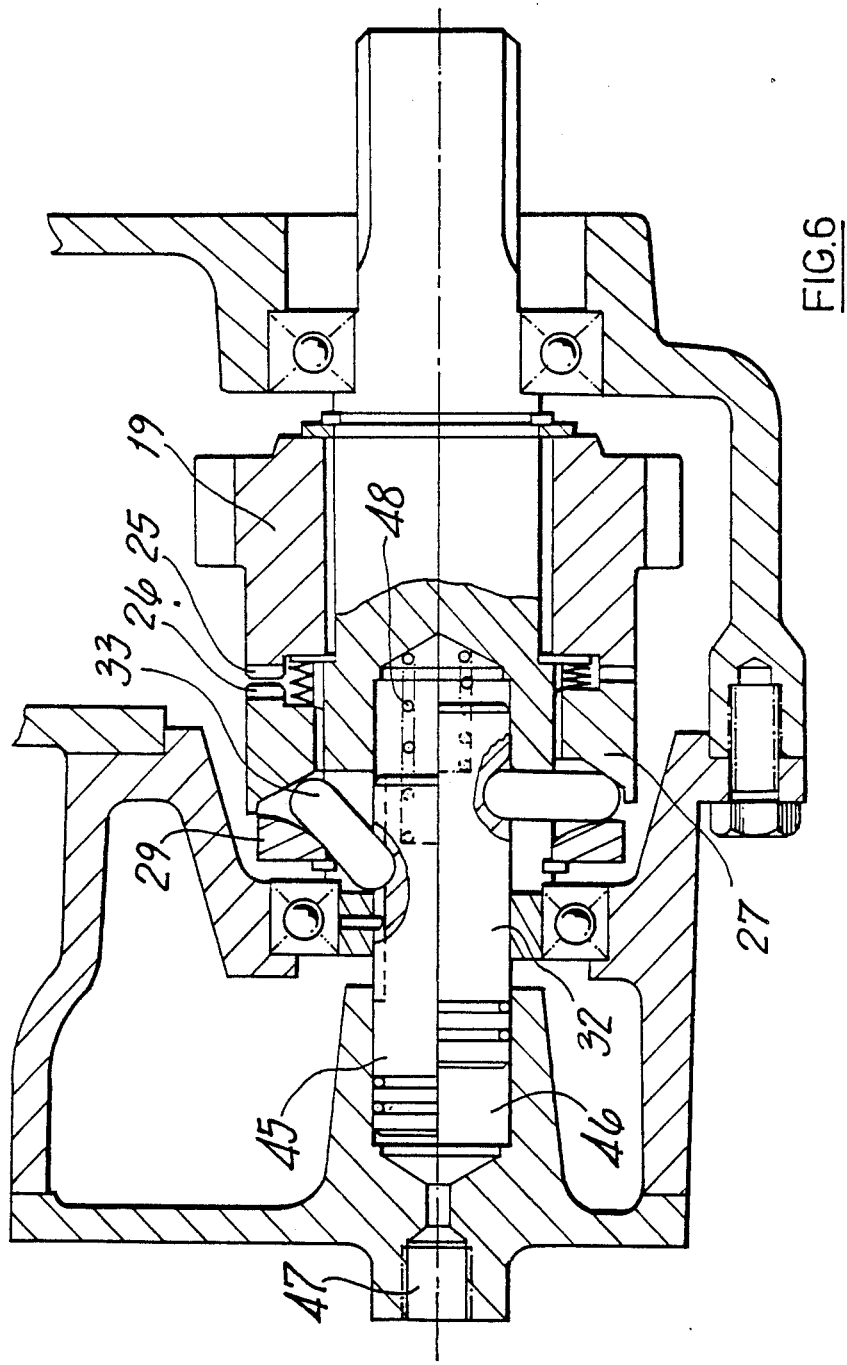
FIG. 6 shows an enlarged view of an alternative form of clutch actuation.

FIG. 6 shows a modified arrangement in which the mechanical actuation of actuating shaft 32 is replaced by fluid pressure (for example hydraulic) actuation. In the arrangement shown in FIG. 6 the left hand end of actuating shaft 32 operates as an hydraulic piston sliding in a bore 45. To displace the actuating shaft 32 to the right, in order to engage the clutch, hydraulic pressure is supplied to a chamber 46 via an inlet 47 under the control of a solenoid-operated valve (not shown). A return spring 48 is provided within the right hand end of actuating shaft 32 which together with springs 42 displaces the actuating shaft 32 to the left to disengage the clutch whenever the hydralic pressure in chamber 46 is vented.

Figure 7:
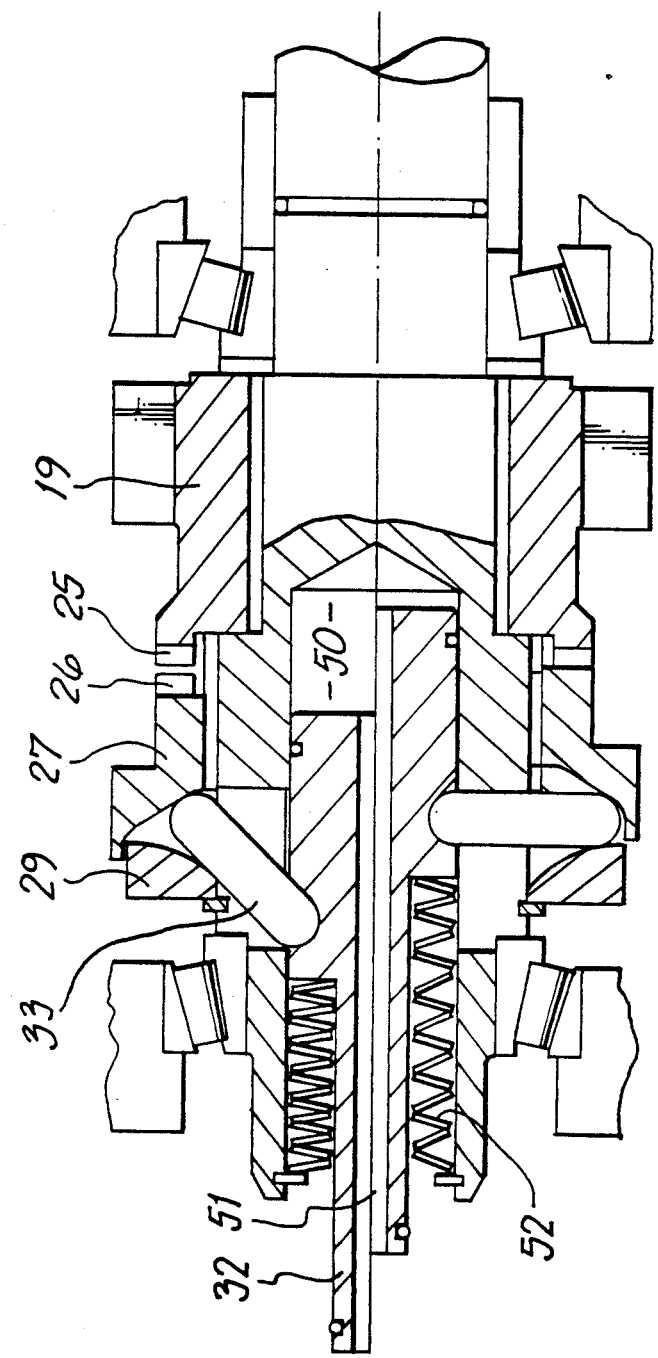

In a still further modification shown in FIG. 7 the actuating shaft 32 is biassed to the right by a strong belleville spring 52 to engage the teeth 25 and 26 and is movable to the left to disengage teeth 25 and 26 by hydraulic pressure fed into chamber 50 via a bore 51 down the centre of shaft 32 under the control of a solenoid -operated valve (not shown). Such an arrangement ensures that should the hydraulic pressure fail the clutch is automatically engaged by the belleville spring 52 which is particularly desirable in the tractor front wheel drive application described.

The hydraulically operated arrangements shown in FIGS. 6 and 7 can be interfaced with the braking system of a tractor for example by using an electrical switch associated with the brake pedal) so as to actuate the solenoid valve which controls the supply and exhaust of fluid to and from chambers 46 and 50 to ensure that the clutch is automatically engaged to connect drive to the front wheels of the tractor whenever the brake pedal is operated to give more efficient braking of the tractor.

Figure 8:
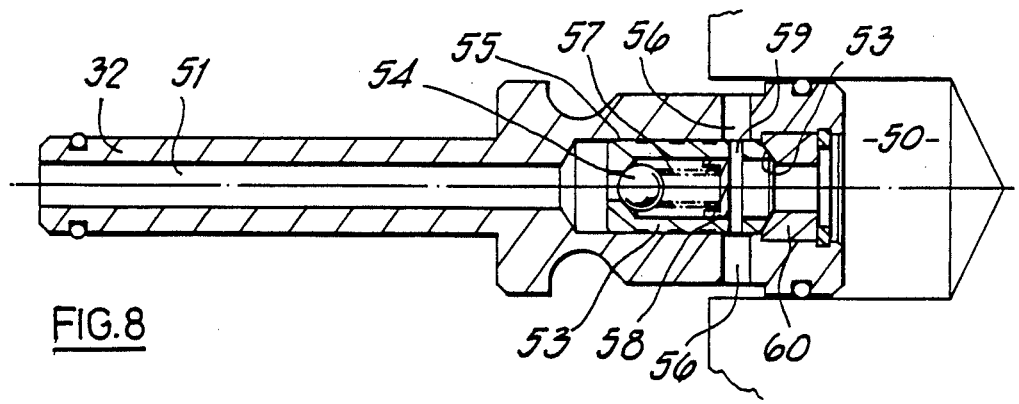

FIG. 8 shows a modified form of the shaft 32 shown in FIG. 7 which incorporates a valve member 53 to assist in venting the pressure from chamber 50 more quickly to provide an efficient and rapid engagement of the clutch.

When bore 51 is pressurized valve member 53 is displaced to the right to the position shown in FIG. 8 with valve surface 53a in contact with valve seat 60 and chamber 50 supplied with fluid under pressure via a spring-loaded non-return valve member 54 whose spring 57 reacts against a cap 58 retained by a cross-pin 59.

When bore 51 is vented to engage the clutch the higher pressure in chamber 50 displaces valve member 53 to the left as viewed in FIG. 7 within bore 55 to open valve seat 60 and allow the fluid in chamber 50 to discharge via drillings 56 into the sump provided by the housing 10, 11 and 12.

It is also envisaged that the modification shown in FIG. 8 may itself also be used in a modified form in which the non-return valve member 54, spring 57, cap 58 and cross-pin 59 are deleted.

As shown in FIG. 2, the toggle members 33 may also be arranged to go to an over-centre position 33" in the constructions shown in FIGS. 6 and 7.

We claim:

1. A clutch actuating system comprising:
   an actuating member movable between a first position in which the clutch is disengaged and a second position in which the clutch is engaged, a pair of adjacent reaction members with mutually inclined wedging surfaces on confronting faces, one of said reaction members being operatively connected with the clutch, and at least one elongated toggle member operatively connected at one end with the actuating member and extending between the wedging surfaces of the reaction members at its other end, the arrangement being such that movement of the actuating member from its first to its second position causes the toggle member to execute a toggle action and to be forced further between the wedging surfaces to separate the reaction members to engage the clutch and causes the toggle member to assume a stable position in which the actuating member is held in its second position by the transmission of force along the toggle member between its ends thus holding the clutch engaged.

2. An actuating system according to claim 1 in which the, or each toggle member is arranged to move overcentre to its stable position.

3. An actuating system according to claim 1 in which the actuating member is encircled by the reaction members and arranged so that axial movement of the actuating member relative to the reaction members forces the or each toggle member radially outwardly between the wedging surfaces on the reaction members thus axially displacing one of the reaction members to engage the clutch.

4. An actuating system according to claim 1 in which a mechanical linkage is provided to move the actuating member from its first to its second position to engage the clutch and also to move the actuating member to move the or each toggle member out of its stable position to allow release of the clutch.

5. An actuating system according to claim 1 in which a fluid pressure operated actuator is provided to move the actuating member from its first to its second position to engage the clutch and spring means are provided to move the actuating member to move the or each toggle member out of its stable position to allow release of the clutch when the actuator is not pressurized.

6. An actuating system according to claim 1 in which a spring means is provided to move the actuating member from its first to its second position to engage the clutch and a fluid pressure operated actuator is provided to move the actuating member to move the or each toggle member out of its stable position and overcome the spring means to allow release of the clutch.

7. An actuating system according to claim 6 in which the actuating member is encircled by the reaction members and a portion of the actuating member acts as a piston of the fluid pressure operated actuator so that axial movement of the actuating member relative to the reaction members forces the or each toggle member radially outwardly between the wedging surfaces on the reaction members thus axially displacing one of the reaction members to engage the clutch.

8. An actuating system according to claim 7 in which fluid under pressure is supplied into a chamber of the actuator via a passageway in the actuating member to displace the piston, the actuating member including vent means for ensuring rapid venting of the pressure in the chamber of the fluid pressure operated actuator to allow rapid displacement of the actuating member by the spring means.

9. A toothed-dog type clutch in which two toothed dog members are axially displaced relative to each other to interengage their teeth and thus engage the clutch by an actuating system according to claim 1.

10. A clutch according to claim 9 in which the interengaging teeth of the dog members are angled on cooperating surfaces to provide a separation force tending to disengage the dog members, the arrangement being such that as soon as the actuating member is moved towards its first position sufficiently to move the or each toggle member away from its stable position the separation force assists disengagement of the dog members.

11. A clutch according to claim 9 in which one dog member is operatively connected with a driving gear and the other dog member is operatively connected with a front wheel drive shaft of a four-wheel-drive tractor so that engagement of the clutch connects drive to the front wheels of the tractor.

12. A four-wheel-drive tractor with front and rear drivable wheels, the tractor being provided with a clutch according to claim 11 to provide a disconnectable drive to the front wheels.

* * * * *